United States Patent
Thiele et al.

(10) Patent No.: US 10,567,827 B2
(45) Date of Patent: Feb. 18, 2020

(54) METHOD OF DETECTING AND SYNCHRONIZING AUDIO AND VIDEO SIGNALS AND AUDIO/VIDEO DETECTION AND SYNCHRONIZATION SYSTEM

(71) Applicant: Sennheiser electronic GmbH & Co. KG, Wedemark (DE)

(72) Inventors: Markus Thiele, Hannover (DE); Björn Wolter, Hannover (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 73 days.

(21) Appl. No.: 15/560,827

(22) PCT Filed: Apr. 11, 2016

(86) PCT No.: PCT/EP2016/057915
§ 371 (c)(1),
(2) Date: Sep. 22, 2017

(87) PCT Pub. No.: WO2016/162560
PCT Pub. Date: Oct. 13, 2016

(65) Prior Publication Data
US 2018/0115799 A1    Apr. 26, 2018

Related U.S. Application Data

(60) Provisional application No. 62/145,690, filed on Apr. 10, 2015.

(51) Int. Cl.
*H04N 21/43* (2011.01)
*H04N 21/41* (2011.01)
*H04N 21/8547* (2011.01)

(52) U.S. Cl.
CPC ..... *H04N 21/4307* (2013.01); *H04N 21/4104* (2013.01); *H04N 21/8547* (2013.01)

(58) Field of Classification Search
CPC .......... H04N 21/4307; H04N 21/4104; H04N 21/8547
See application file for complete search history.

(56) References Cited

U.S. PATENT DOCUMENTS

| | | | |
|---|---|---|---|
| 2002/0080241 A1* | 6/2002 | Paritsky | H04N 5/232 348/207.99 |
| 2008/0044036 A1* | 2/2008 | Konchitsky | H04R 3/00 381/71.1 |

(Continued)

FOREIGN PATENT DOCUMENTS

| | | |
|---|---|---|
| DE | 10 2010 038838 | 2/2012 |
| WO | WO 2013/116777 | 8/2013 |

OTHER PUBLICATIONS

International Search Report for Application No. PCT/EP2016/057915 dated Jul. 7, 2016.

*Primary Examiner* — Michael E Teitelbaum
(74) *Attorney, Agent, or Firm* — Haug Partners LLP

(57) ABSTRACT

There is provided a method of detecting and synchronizing audio/video signals. At least one audio signal is detected by means of at least one microphone unit. Timestamps are generated and stored together with the detected audio signal in the microphone unit. An optical synchronization signal is output by the microphone unit, wherein the optical synchronization signal contains optical timestamps which are respectively associated with one of the generated timestamps. At least one video signal is detected by means of at least one camera unit. The video signal at least partially has the optical synchronization signal output by the microphone unit. The optical timestamps contained in the optical synchronization signal are extracted. The video signal and the audio signal are synchronized on the basis of the timestamps in the audio signal and the optical timestamps extracted from the detected optical synchronization signal.

9 Claims, 3 Drawing Sheets

(56) References Cited

U.S. PATENT DOCUMENTS

2011/0085025 A1     4/2011   Pace et al.
2017/0336483 A1*   11/2017   Cunningham ....... G01R 33/286

* cited by examiner

METHOD OF DETECTING AND SYNCHRONIZING AUDIO AND VIDEO SIGNALS AND AUDIO/VIDEO DETECTION AND SYNCHRONIZATION SYSTEM

The present application claims priority from International Patent Application No. PCT/EP2016/057915 filed on Apr. 11, 2016, which claims priority from U.S. Provisional Patent Application No. 62/145,690 filed on Apr. 10, 2015, the disclosures of which are incorporated herein by reference in their entirety.

FIELD OF THE INVENTION

It is noted that citation or identification of any document in this application is not an admission that such document is available as prior art to the present invention.

The present invention concerns a method of detecting and synchronizing audio and video signals, and a microphone unit for detecting and storing audio signals having means for synchronization of the audio signal with detected video signals.

Mobile devices like smartphones are frequently equipped with a powerful camera. Even events at a relatively great spacing from the camera can be filmed by using a zoom function. That can be for example a performance on the stage in a school auditorium, in which the user of the mobile device (camera unit) is sitting in the audience and produces a video recording of what is taking place on the stage. An audio recording with a microphone included in the camera unit often gives unsatisfactory results as a great deal of ambient noise is recorded from the direct environment of the camera unit, which is unwanted, while the desired audio signal—for example the words being spoken on the stage—is detected too quietly and is lost in the ambient noise.

An external microphone can be used to remedy that. This can be for example a clip-on microphone which a performer on the stage has secured to his clothing and which detects the audio signal spoken or sung by the performer, or an overall audio signal from the relatively near surroundings thereof. If an external microphone is connected to the camera unit by way of a cable the audio signal from the external microphone can be recorded directly at the same time and thus synchronously together with the detected video signal. In many cases however—like for example in an auditorium—wired transmission of the audio signal is not practicable.

Alternatively the audio signal detected by the external microphone can be wirelessly transmitted to the camera unit. Systems are known from wireless microphone technology, with which an audio signal can be transmitted to a receiver without a perceptible time delay. Because of the mutual influence with other wireless transmission paths however such systems cannot be used in uncoordinated fashion and are therefore subject to legal restrictions. The transmission power is legally limited for uncoordinated use of a wireless path so that only a short distance can be bridged. Reliable transmission from a stage to a place in the auditorium can therefore not be guaranteed.

It is also desirable that the wirelessly transmitted audio signal can be received with a normal camera unit, like for example a smartphone, without involving additional hardware. Individualized wireless data transmission protocols are available for such mobile end user devices. As an example mention may be made here of WLAN, Bluetooth, DECT or wifi, in which a data stream is respectively intended for a given end device and is transmitted to the receiving end device in a condition of being subdivided into individual data packets. When using those data transmission protocols however an unpredictable time delay is tolerated in the transmission of each individual data packet as the use of a transmission channel is coordinated in accordance with the protocol between a plurality of transmitting devices so that there are variable waiting times for access to the transmission channel. In addition the transmission is normally bidirectional, wherein a receiving device acknowledges a successful reception and in the event of defective transmission a data packet is transmitted again, which additionally leads to unpredictable delays. In total a delay of several seconds can occur. An audio signal received in that way is time-delayed in relation to the video signal detected by the camera unit by an unknown amount to such an extent that the time delay is perceived as being disruptive, when the video/audio signal is later viewed. Without additional synchronization measures it is not possible for the audio signal to be subsequently shifted to the correct position with respect to the video signal.

As a further alternative to wireless transmission it is possible to provide for storage of the audio signal in the external microphone unit. The audio signal of the external microphone signal is then subsequently brought together with the video signal by the camera unit. This case also involves the problem of subsequently moving the audio signal with respect to the video signal to the correct position on the time axis.

DE 10 2010 038 838 A1 discloses a wireless microphone system in which a microphone unit detects an audio signal and files same jointly with "timestamps" and wherein a camera unit stores corresponding timestamps jointly with the video signal and wherein the camera unit outputs synchronization signals, on the basis of which the microphone unit produces timestamps matching the video signal.

SUMMARY OF THE INVENTION

An object of the present invention is to provide a method of detecting and synchronizing audio/video signals, which allow subsequent synchronization of related audio and video signals.

Thus there is provided a method of detecting and synchronizing audio/video signals. At least one audio signal is detected by means of at least one microphone unit. Timestamps are generated and stored together with the detected audio signal in the microphone unit. An optical synchronization signal is output by the microphone unit, wherein the optical synchronization signal contains optical timestamps which are respectively associated with one of the generated timestamps. At least one video signal is detected by means of at least one camera unit. The video signal at least partially has the optical synchronization signal output by the microphone unit. The optical timestamps contained in the optical synchronization signal are extracted. The video signal and the audio signal are synchronized on the basis of the timestamps in the audio signal and the optical timestamps extracted from the detected optical synchronization signal.

According to an aspect of the present invention the microphone unit can generate the timestamps from an absolute time signal.

According to a further aspect of the present invention the microphone unit is in the form of a hand-held microphone, a clip-on microphone or a pocket transmitter unit connected to a microphone by way of a cable.

The microphone unit has a light-emitting surface for output of the optical synchronization signal of between 0.5 and 2 cm$^3$, in particular 1 cm$^3$.

According to a further aspect of the present invention the microphone unit can be activated once and then the audio signal can be continuously detected and stored together with the timestamps. An association of a video signal detected by the camera unit with the relevant position in the detected audio signal can be effected on the basis of the timestamps.

According to a further aspect of the present invention there is a plurality of detected audio signals of a plurality of camera units and can be post-synchronized with the detected audio signals on the basis of the timestamps generated from the absolute time signal.

The invention also concerns a system for detecting and synchronizing audio/video signals. The microphone has at least one microphone unit for detecting at least one audio signal, for generating timestamps, for storing the detected audio signal together with the generated timestamps and for output of an optical synchronization signal. The optical synchronization signal contains optical timestamps respectively associated with one of the generated timestamps. The system further has a camera unit for detecting at least one video signal. The video signal at least partially has the optical synchronization signal output by the camera unit. The optical timestamps contained in the optical synchronization signal are extracted and the video signal and the audio signal are synchronized based on the timestamps in the audio signal and the optical timestamps extracted from the detected optical synchronization signal.

The invention also concerns a microphone unit comprising a microphone capsule for detecting audio signals, a timestamp unit for generating timestamps, a memory for storing the detected audio signals and the associated timestamps, and an optical signal output unit for output of an optical synchronization signal which contains optical timestamps associated with a respective one of the generated timestamps.

The invention also concerns a camera unit comprising a control unit for extracting optical timestamps from a detected video signal and for synchronizing the detected video signal with an audio signal which is detected by an external microphone unit and which has timestamps, with which a respective one of the optical timestamps is associated, wherein synchronization can be effected on the basis of the optical timestamps and the timestamps in the audio signal.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
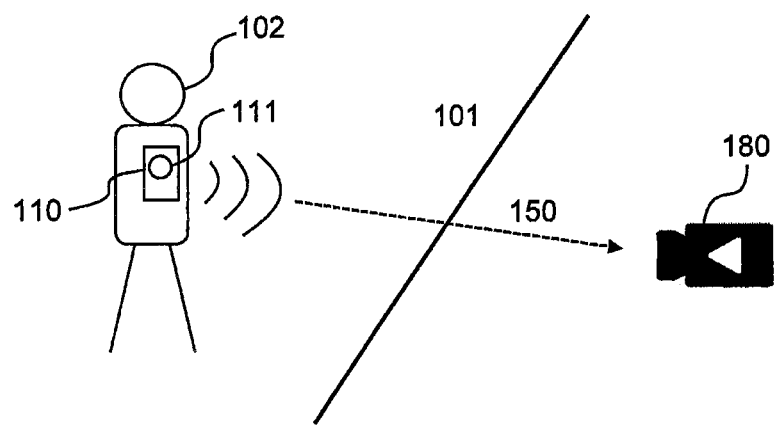
FIG. 1 shows a situation of use of a microphone unit according to a first embodiment.

FIG. 1 shows a situation of use of a microphone according to a first embodiment of the invention. A performer 102 is on a stage 101. A video recording of what is happening on the stage is produced with a camera unit 180 from an auditorium. A microphone unit 110 is disposed on the stage with the performer 102. The microphone unit 110 can be for example a clip-on microphone, a hand-held microphone or a pocket unit connected to a microphone by way of a cable. Optionally the microphone unit 110 can also be positioned separately from the performer, for example on a microphone stand on the stage 101. According to the invention an optical signal output unit 111 which is preferably in the form of an LED belongs to the microphone unit 100.

The notion of the invention involves storing the audio signal recorded by the microphone unit 110 together with timestamps and by way of the signal output unit 111 outputting optical synchronization signals 150 which are in time-association with the timestamps of the audio signal. The optical synchronization signal 150 therefore contains optical timestamps 117 which are associated with a respective timestamp 117 stored with the audio signal. The optical signal output unit 111 is positioned in such a way that it can be at least occasionally optically detected by the camera unit 180. If the microphone 110 is in the form of a clip-on microphone it can be for example secured visibly to the clothing of the performer 102, in which case the optical signal output unit 111 is not concealed. If now a video signal on which the performer 102 is to be seen is recorded with the camera unit, in that case the optical signal output unit 111 is also automatically to be seen in the video signal. Thus, by virtue of later evaluation of the video signal, it is possible to retrieve the optical synchronization signal 150 in the recorded video signal and thus to track in the video signal the moments in time which correspond to the timestamps stored jointly with the audio signal. On the basis of the moments in time recognized in that way in the video signal a correct time association between the video signal and the audio signal can be made subsequently by way of the timestamps stored with the audio signal, that is to say post-synchronization can be implemented.

The particular advantage of these "optical timestamps" is that the camera unit 180 does not need to include any provisions at all which are intended for synchronization with an external audio signal. A conventional camera can be utilized for video detection in a system according to the invention as soon as it detects an optical synchronization signal 150 according to the invention. There is also no need for initial synchronization to take place between the microphone unit 110 and the camera unit 180.

The correct time association of the audio signal with a video signal, in accordance with the invention, can be used both if the audio signal together with the associated timestamps was transmitted wirelessly, but with an unknown time delay, to the camera unit 180, and also if the audio signal was firstly put into intermediate storage in the microphone unit 110 and is only to be brought together with the video signal in a later step.

Figure 2:
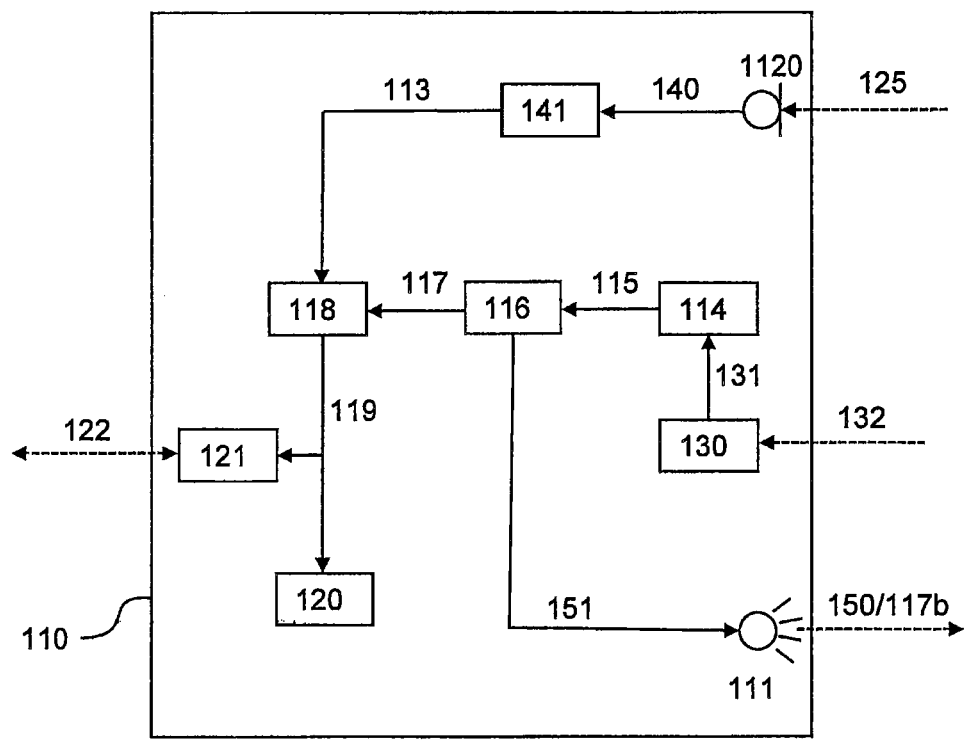
FIG. 2 shows a block circuit diagram of the microphone unit of the first embodiment.

FIG. 2 shows a block circuit diagram of the microphone unit 110 according to the first embodiment. The microphone unit 110 includes a microphone capsule 112. It detects an acoustic audio signal 125 and produces therefrom an analog audio signal 140. An A/D converter 141 produces therefrom a digital audio signal 113. The microphone unit 110 includes an internal clock 114 which continuously generates a time signal 115. A timestamp unit 116 generates therefrom preferably at regular intervals digital timestamps 117 and an associated light control signal 151. The light control signal 151 actuates the optical signal output unit 111 so that it outputs the optical synchronization signal 150 which then contains optical timestamps 117b. A combining unit 118 links the digital audio signal 113 to the digital timestamps 117 and in so doing produces the audio/timestamp signal 119. The audio/timestamp signal 119 can be stored in a memory 120 which belongs to the microphone unit 110 and from which it can be read out again for later use. Optionally the microphone unit 110 includes a wireless transmitter 121, by way of which the audio/timestamp signal 119 can be wirelessly output as a transmission signal 122. Output of the data from the memory 120 can also be provided by way of the wireless transmitter 121. Wireless transmission is preferably effected in a form in which the data can be received with a normal mobile end user device like for example a smartphone without additional hardware. As examples of the transmission method mention is to be made here of WLAN, Bluetooth, DECT or wife. Wireless data transmission 122 is preferably bidirectional so that for example control data can be transmitted along that path to the microphone unit 110.

Optionally the microphone unit 110 also contains a time signal receiver 130 which occasionally wirelessly receives a generally available absolute time signal 132 from a time signal transmitter (in Germany for example DCF77, in the USA WWV, also GPS contains an absolute time signal) and transfers it as an absolute time signal 131 to the clock 114. The clock 114 which includes an internal clock generation means which on its own would diverge over a long period of time from the absolute time can be matched to the received absolute time upon the reception of a respective time signal 132.

In a preferred embodiment the components associated with the microphone unit 110 are disposed in a common housing which is of the smallest possible dimensions. The housing preferably has a holding element, with which it can be secured to the clothing of a user in the manner of a brooch. It can be secured for example to a shirt or a pullover in the proximity of the neck of the user in order to pick up the voice of the user.

Figure 5:
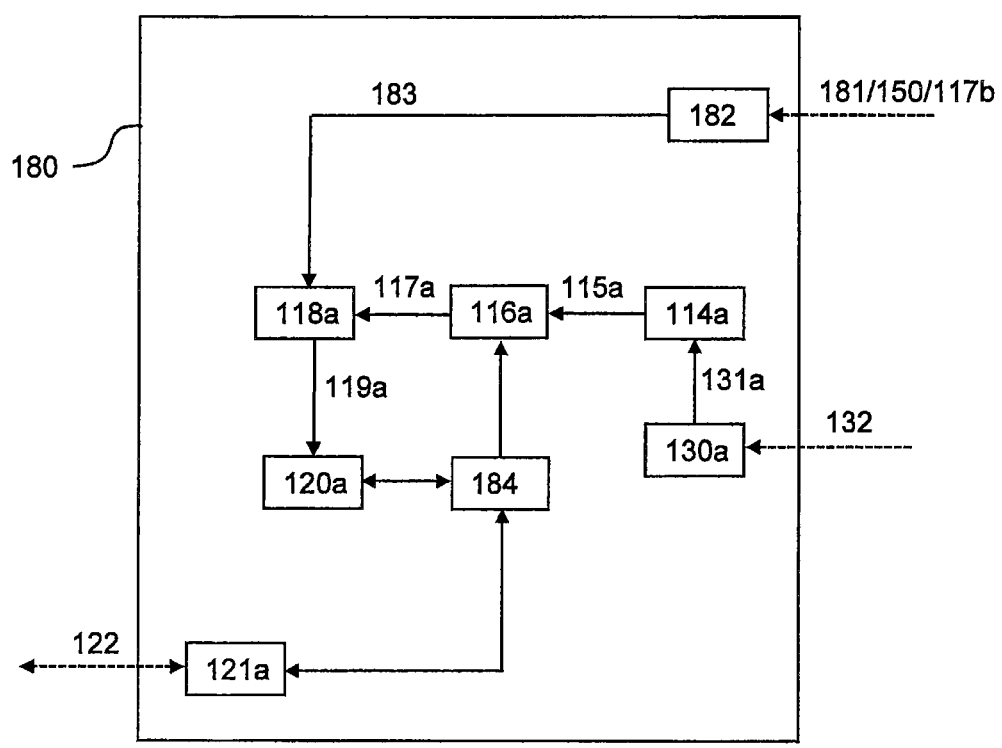
FIG. 5 shows a block circuit diagram of a camera unit according to an embodiment.

FIG. 5 shows a block circuit diagram of a camera unit 180 according to an embodiment. The camera unit 180 includes an optical detection unit 182. It detects an optical signal 181 which can include the optical synchronization signal 150 and thus the optical timestamps 117b and generates therefrom a video signal 183. The camera unit 180 optionally includes a clock 114a which continuously produces a time signal 115a. A timestamp unit 116a generates therefrom preferably at regular intervals digital timestamps 117a. Optionally a combining unit 118a links the video signal 183 to the digital timestamps 117a and in so doing generates the video/timestamp signal 119a. The video/timestamp signal 119a can be stored in a memory 120a which belongs to the camera unit 180 and from which it can be read out again for later use. Optionally the camera unit 180 includes a wireless transmitting/receiving unit 121a, by way of which it is possible to produce a wireless bidirectional connection 122 to the microphone unit 110. The camera unit 180 also includes a control unit 184 which inter alia serves for controlling the timestamp unit 116a, for processing the video/timestamp signal 119a from the memory 120a and for controlling the data transmission by way of the bidirectional connection 122. The control unit 184 also serves for extracting the "optical timestamps" from a detected video signal.

Optionally the camera unit 180 also includes a time signal receiver 130a which occasionally wirelessly receives a generally available absolute time signal 132 from a time signal transmitter and transfers it as an absolute time signal 131a to the clock 114a. The clock 114a which includes internal clock generation means which on its own would diverge over a long period of time from the absolute time can be matched to the received absolute time upon reception of a respective time signal 132.

Possible configurations of the optical synchronization signal 150 will be discussed in greater detail hereinafter.

In the simplest case the optical synchronization signal 150 can comprise short light pulses which are respectively emitted at a moment in time at which the timestamp unit 116 generates a timestamp which is then inserted into the audio/timestamp signal 119. The time spacing of the light pulses can be for example 1 second. The notion is comparable to the "clapper" known from analog film technology. The audio/timestamp signal 119 contains moments in time which are marked by way of the timestamps and which respectively belong to a moment in time which can be recognized in the video signal of the camera unit 180 by the filmed light pulse. If there is only a slight time delay (for example less than 1 second) between the video signal and an associated wirelessly transmitted audio/timestamp signal 119 the audio signal can be shifted to the correct position on the time axis with respect to the video signal on the basis of the marked moments in time which can be detected in both signals.

If however the time delay between the received audio/timestamp signal 119 and the video signal is greater than the spacing between the timestamps there can be a misassociation between the timestamps and filmed light pulses so that the audio signal is associated in shifted relationship with the video signal, in which case then the time shift is an integral multiple of the time interval between the timestamps. In order to counteract that situation a variable time interval can be provided between the timestamps. For example the time interval between two timestamps and thus also between the associated light pulses of 0.1 second can be extended in each step by 0.1 second, that is to say 0.1 s; 0.2 s; 0.3 s and so forth. That can be effected for example to a maximum interval of 2.0 seconds and can then begin from the start. In regard to the time association between the audio and video signal then at least two marked moments in time in the video signal must be evaluated and an association with the position in the audio signal, at which the timestamps are at the same spacing from each other, can be effected on the basis of the time interval between those two moments in time.

In the above-mentioned numerical example there are 20 variously possible intervals between the timestamps. In the above-proposed periodic repetition of the intervals nonetheless a misassociation can therefore occur. In order to counteract that, optionally any (for example random) sequences of the 20 possible intervals between the timestamps can be provided and upon evaluation of the video signal a longer sequence of detected light pulses can be examined, the time succession of which can then be respectively associated with the appropriate position in the audio/timestamp signal.

For a second improved implementation of the optical synchronization signal 150 encoding of data can be provided in the optical synchronization signal 150. For example the optical signal output unit 111 can have two different states. In particular it can be provided for example in the form of an LED with the states "light" and "dark". If the LED is actuated in a fixed time pattern with a respective one of the two states it can transmit one bit in each step in that pattern. The length of a time pattern step can be for example 0.1 second. Thus up to 10 bits per second can be transmitted. The length of a step in the time pattern should be so selected that a bit is reflected at least in two successive images of a video signal recorded by the camera so that an unclear detection of a bit state in an image can be reliably recognized in the following image. With an image repetition rate of 50 Hz therefore the bit rate should be selected to be less than 25 bits per second.

Figure 3:
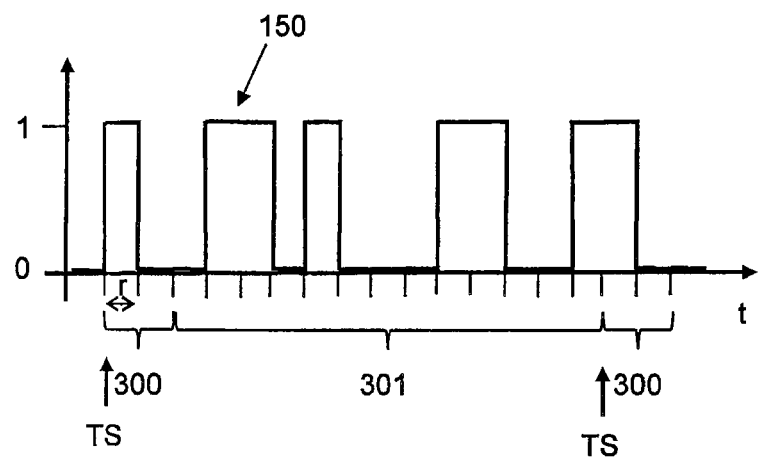
FIG. 3 shows a time pattern of an optical synchronization signal with encoded data.

FIG. 3 shows a possible time configuration of an optical synchronization signal 150 with encoded data in relation to time t. The signal 150 can change between the states 0 and 1 and retains that state in each case for a duration r which corresponds to a step length in the selected time pattern. A timestamp 117 is respectively generated for the audio signal at a moment in time TS. At the same moment a start recognition bit sequence 300 can begin in the signal 150. The individual bits of the useful data to be transmitted can then be output in succession in the time window 301 in the same time pattern. Although the transmission of the bit sequence requires a longer period of time, a certain moment in time is defined with the start time of the start recognition sequence 300, and that certain moment in time can be recognized in the video signal as the marked timestamp time TS.

The useful data output at each timestamp 117 by way of the optical synchronization signal 150 preferably has a fixed number of bits. The respectively following timestamp can be generated immediately as soon as the bit sequence belonging to the previous timestamp has been completely transmitted. In that way timestamps are produced, which are equidistantly spaced from each other in time.

The useful data to be transmitted at a timestamp 117 comprise in particular continuous numbering of the individual timestamps. Thus each timestamp contains an individual continuous identification which is both contained in the audio/timestamp signal 119 and can also be read out of the video signal. This permits a unique association of each individual timestamp time in the two signals.

Optionally further useful data can be transmitted by means of the optical synchronization signal 150 and can be additionally placed with the timestamps in the audio signal. For example this can be an individual identification number of the microphone unit 110. This is advantageous if a plurality of microphone units 110 according to the invention are being used for example on a stage so that a plurality of optical synchronization signals from the camera 180 are detected in the image. In addition positional, date and/or clock time information can be useful in order to permit an association of a detected audio signal with a video signal recorded at a given event.

The two states of the optical synchronization signal 150 ("light" and "dark") can preferably be so selected that the difference between the two states is scarcely perceived with the human eye in order to avoid disturbing the viewer. In addition the state "light" can be so selected that illumination of the LED scarcely catches the attention. The states only have to be so established that it is possible to reliably distinguish the two states in the video signal.

For good recognition of the optical signal output unit 111 in the video signal the light-emitting surface of the optical signal output unit 111 should be of a minimum size. That can be for example 1 square centimeter. For better recognition capability in the video signal the light-emitting surface can be of a particular shape like for example a logo. Optionally it is also possible to use a plurality of LEDs in a defined arrangement with each other. In that case the data rate which can be transmitted with the optical synchronization signal 150 can be multiplied by the number of LEDs used, by virtue of individual actuation of the individual LEDs.

Optionally, for example at the beginning of an event, a bidirectional wireless connection can be constituted by way of the wireless transmitter 121 between a microphone unit 110 and a camera unit 180 (for example a smartphone) for the purposes of transmitting the audio data. If the wireless connection is interrupted during the event the microphone unit 110 nonetheless still stores the audio/timestamp signal 119 in the memory 120. Optionally subsequent transmission of the missed portions of the audio data from the memory 120 can be started automatically as soon as the wireless connection between the two devices is available again.

Wireless transmission of the audio data can optionally be effected in encrypted fashion. In addition further items of information can be communicated jointly with the audio signal between the microphone unit 110 and the receiving device, for example: the state of the battery, radio frequencies used for the transmission, disruptions to the radio frequencies, currently prevailing transmission quality, level matching, and clock/crystal synchronization. The microphone unit 110 can also have an interface, by way of which it can be controlled in wired relationship, for example by way of USB, or by way of which the data in the memory 120 can additionally be read out.

The microphone unit 110 can have an energy storage means (battery/accumulator) and an operating unit. The operating unit serves to activate the microphone unit 110 and start audio recording. Optionally control of the microphone unit 110 is possible by way of the bidirectional wireless connection to an external device like for example a smartphone. In particular the audio recording can be started and stopped by way of that wireless connection.

As already mentioned the ongoing existence of a wireless connection cannot be reliably guaranteed for example during an event. Typically only individual portions of an event are recorded with a camera unit. If now no wireless connection to a microphone unit 110 is available external activation of the microphone unit 110 from the camera unit 180 is not possible so that in that case no audio signal is available from the microphone unit 110. The unique association of the individual timestamps between audio and video signal however affords a use option which resolves that problem: the microphone unit 110 is activated once only before the beginning of the event and continuously records the audio signal throughout the entire event. The audio recording is stopped only after the end of the event. If now an individual portion of the event is filmed with a camera unit 180, it is sufficient if the complete identification of a single timestamp is to be found in that portion of the video signal. When the entire recorded audio signal is later brought together with the video signal which contains only the portion of the event, it is then possible on the basis of that identification to remove from the audio signal precisely the portion which belongs to the portion recorded on the video and then associate it at the correct position on the time axis.

Further use options arise out of that possibility of subsequently bringing the signals together. If for example a number of adults at a performance in a school auditorium made video recordings of an event and in that case a child on the stage was wearing a microphone unit 110 according to the invention a plurality of video and audio recordings can be subsequently put together. The adults can for example agree to store all their audio and video recordings of the event in a Dropbox over the Internet and thus make them available to each other. The audio/timestamp signal 119 from the complete event then plays a central role. Here there is a continuous time axis for the entire event. Each individual video sequence from which the complete identification of a single timestamp is to be taken can then be placed at its correct position on the time axis. An audio signal stored together with a video sequence is then automatically arranged correctly on the time axis together with the video sequence. With suitable software each user can then switch individually between the various viewing angles and audio signals. For example a user can thus compile a video in which he assembles an associated continuous sequence of his own child (for example a song which the child sings, in which case the audio signal can be used continuously from the microphone 110), with changing camera perspectives.

Figure 4:
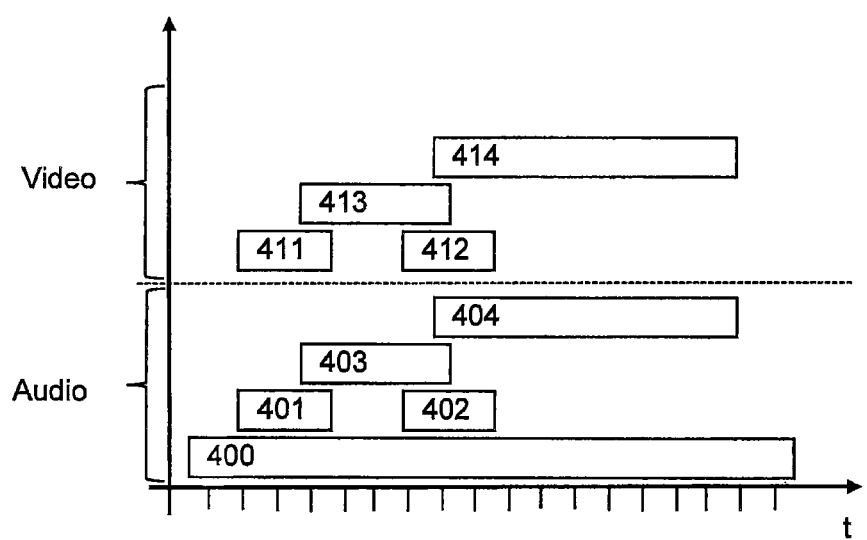
FIG. 4 shows an arrangement of audio and video signals with an association on the time axis.

FIG. 4 shows an arrangement of audio and video signals with an association on the time axis. Audio sequences are shown in the lower half and video sequences are shown in the upper half above the time axis. The audio sequence 400 corresponds to the audio/timestamp signal 110 from the entire event. The video sequence 411 is arranged correctly on the time axis by means of at least one timestamp identified therein. The audio sequence 401 belongs to the video sequence 411 and could thus be placed on the time axis parallel in respect of time with the video sequence 411. Correspondingly the video sequence 413 was positioned with the associated audio sequence 403 at the correct position on the time axis. The same applies to the video sequence 412 with the associated audio sequence 402 and for the video sequence 414 with the associated audio sequence 404. A representation as in FIG. 4 is known from common application software for audio/video processing. In the compilation of his desired sequence the user can freely change between the individual correctly positioned audio and video channels.

In order to support the use situation involving the compilation of a plurality of video signals the microphone unit 110 can for example be mounted on a microphone stand on the stage in such a way that it is visible from the auditorium throughout the entire event. That enhances the probability that the optical synchronization signal 150 can be recognized on the video sequences. For bringing video signals together in that way it is theoretically even possible to dispense with the audio signal 113. The audio/timestamp signal 119 then only contains the timestamps, on the basis of which the video sequences can be time-distributed, on which the optical synchronization signal 150 is to be seen.

A further embodiment arises out of a use of the absolute time to which the clock 114 is matched on the basis of the time signal receiver 130. Instead of continuous numbering of the timestamps the timestamps as well as the data transmitted by means of the optical synchronization signal can include information in respect of the absolute time. The above-described use is maintained to its full extent. In addition however there is also the advantage that a plurality of microphone units 110 according to the invention are synchronized to the same absolute time provided by an external time signal. If then a plurality of microphone units 110 are to be seen in a video sequence they all emit the same optical synchronization signal 150. In addition they put respective timestamps with the same absolute time in their respective audio/timestamp signal 119. This therefore also ensures that the audio signals of a plurality of microphone units 110 are subsequently brought together in correct relationship in respect of time, without any problem. If therefore in a situation in an auditorium a plurality of children are fitted with a microphone unit 110 according to the invention, it is also possible to choose between the microphone signals from the various children in the compilation operation as shown in FIG. 4. The same applies for an additional microphone unit 110 mounted on a microphone stand on the stage.

A further configuration concerns the camera unit 180. Optionally the camera unit 180, just like the microphone unit 110, can have a clock 114 which is matched to the absolute time from a time signal transmitter by way of a time signal receiver 130. A timestamp unit 116 in the camera unit 180 can then, just like the microphone unit 110, generate timestamps 117 which contain the absolute time and can store them jointly with the video signal. Such a video/timestamp signal can always be placed at the correct position on the time axis even without detection of an optical synchronization signal 150. The particular advantage of using an external time signal transmitter for all signals which are to be brought together in correct time relationship arises out of the fact that a correct identical absolute time is always used, without the recording devices having to be previously matched to each other.

The idea is an obvious one that for example a microphone unit 110 (without using absolute time) has to be synchronized only once prior to an event with a camera unit 180 like for example a smartphone and that then both devices can sufficiently accurately generate timestamps in relation to the recorded signals, on the basis of a respective internal clock 114 and 114a. A problem however lies in synchronization between those two devices which could be effected by one of the available wireless transmission protocols like for example WLAN, Bluetooth, DECT or wifi. As explained above such individualized wireless data transmission protocols due to the principle involved have an unpredictable time delay in transmission so that it is not possible to guarantee sufficiently accurate synchronization in that way. In contrast a signal from a time signal transmitter, that is provided at the same time for both devices, does not involve that problem.

In a further embodiment of the invention the notion of one-time synchronization between the camera unit 180 and the microphone unit 110 can however be implemented prior to the beginning of an event. In an initialization procedure which the user carries out prior to the event a wireless connection 122 is firstly formed between the microphone unit 110 and the camera unit 180.

Optionally the camera unit 180 can run software which affords an operating interface for the microphone unit 110 and on that basis, for example by means of bidirectional data transmission 122, implements wireless or wired control of the microphone unit. By way of example the camera unit 180 can be a smartphone on which a suitable app runs and the connection to the microphone unit 110 is made by way of Bluetooth or WLAN or during the initialization phase in wired relationship by way of USB.

After the connection between the two devices has been made the user for the initialization operation films the microphone unit 110 from close using the camera unit 180 and in so doing produces an initialization video sequence.

Either by actuation of an operating unit on the microphone unit 110 or by sending a control command from the camera unit 180 to the microphone unit 110 the microphone unit, as described above in accordance with the invention, is caused to generate a timestamp and to store it with an audio/timestamp signal 119 and by way of the optical signal transmitting unit 111 to output an associated optical identification of the timestamp moment, a single light pulse being sufficient in this embodiment.

The camera unit 180 has its own clock 114a and the software running on the camera unit 180, upon production of the initialization video sequence, produces from its own clock 114a time identifications which it stores jointly with the video sequence filmed for initialization. The initialization video sequence is then evaluated by means of the software in the camera unit 180. In that case, the moment in time at which the microphone unit 110 set a timestamp is sought in the initialization video sequence and same is optically correspondingly marked. On the basis of the camera-specific time identifications stored with the initialization video sequence it is possible to determine a precise time relationship between the clock 114 in the microphone unit 110 and the clock 114a in the camera unit 180.

On the basis of the ascertained time difference between the timestamps 117 of the microphone unit 110 and the time identifications in the initialization video sequence, that are derived from the clock 114a of the camera unit 180, it is possible, for later use of the camera unit 180, to provide for the generation of timestamps 117a on the basis of the clock 114a, wherein same is to be matched to generation of the timestamps 117 in the microphone unit 110.

In subsequent use of the camera unit 180 during the event it produces specific timestamps 117a from its internal clock 114a, that is to say in the same manner as the microphone unit 110, and stores same jointly with the recorded video signal as the video/timestamp signal 119a.

The clocks 114 and 114a are normally sufficiently accurate that they run the same over a number of hours in order to allow sufficiently accurate time association between the audio/timestamp signal 119 marked in that way and the video/timestamp signal 119a.

Instead of adaptation to the timestamps of the microphone unit, at the camera side, it is conversely also possible to adapt generation of the timestamps 117 in the microphone unit 110 to the camera clock 114a. For that purpose the time difference ascertained in the camera unit 180 between the timestamps 117 of the microphone unit 110 and the time identifications in the initialization video sequence is transmitted to the microphone unit 110 and utilized there for the generation of timestamps 117 which are then synchronous with the timestamps 117a from the camera unit 180. As a further option the time delay ascertained from the initialization video sequence can be stored and put to use only in later assembly of the audio/timestamp signal 119 from the microphone unit 110 with the video/timestamp signal 119a from the camera unit 180, in which case the timestamps 117 of the microphone unit and 117a of the camera unit can be generated without previous matching with each other.

In each of those cases a time-correct combination of the audio/timestamp signal 119 from the microphone unit 110 with the video/timestamp signal 119a from the camera unit 180 is possible on the basis of time matching from the described initialization procedure. That applies both in respect of wireless transmission 122 of the audio/timestamp signal 119 to the camera unit 180, that runs in close time relationship but not synchronously, and also for later processing in which the two signals are subsequently brought together.

A preferred situation of use employing the initialization procedure is described hereinafter. Before an event the user makes a wireless connection 122 between the microphone unit 110 and the camera unit 180 and performs the initialization procedure as described. The wireless bidirectional connection 122 is classified as connected by both sides during the event, even if no data transmission takes place over a prolonged period of time. Throughout the entire event the microphone unit 110 produces an audio/timestamp signal 119 and stores it in the memory 120. If now the user produces a video sequence with the camera unit 180, then in that case timestamps 117a are stored with the video signal. Immediately after the start of the video recording the camera unit requires by way of the connection 122 from the microphone unit 110 the portion of the audio/timestamp signal 119, that belongs to the video sequence which has just started. As soon as the camera unit has received the requested audio/timestamp signal 119 the camera unit correlates the received audio signal with the video signal in correct time relationship on the basis of the timestamps and stores the combination in the camera as an audio/video signal. If the wireless connection 122 is not available at the moment of the video recording then the camera unit (without the assistance of the user) repeats the requests for missing portions of the audio/timestamp signal 119 as soon as data can be transmitted again by way of the connection 122 and produces a correct association with the video sequences produced. At the latest when the user after the end of the event takes possession of the microphone unit and in so doing puts the microphone unit 110 and the camera unit 180 in the immediate proximity of each other data transmission will take place by way of the path 122 and the missing audio data are transmitted to the camera unit, relating to the video sequences produced during the event. Without further action on the part of the user therefore he will then find on his camera unit audio-video sequences in respect of which the audio signals ascertained with the microphone unit 110 are stored in correct time relationship with the video sequences produced during the event.

Optionally information about the location at which the device is just disposed can be inserted into the timestamps both in a microphone unit 110 and optionally also in a camera unit 180. In addition an orientation in space which was ascertained for example by way of a compass and/or a gravity sensor (acceleration sensor) can also be introduced into the timestamps.

Evaluation of the video signals is effected by way of suitable software for example in the control unit 184. Here the place in the image at which the optical signal output unit 111 is figured must be recognized by means of a pattern recognition means over a plurality of successive video images. Then a respective sequence of video images has to be examined, in which it is established which of its two states the optical signal output unit 111 respectively occupies. The bit sequence emitted by the optical signal output unit 111 can be determined from the investigation of the sequence of images. A start recognition bit sequence 300 then has to be sought in that bit sequence. The image in which the start recognition bit sequence 300 begins is then associated with the timestamp TS which can be individually identified on the basis of the bit sequence 301 sent thereafter.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A method of detecting and synchronizing audio/video signals, comprising the steps:
   detecting at least one audio signal by means of at least one microphone unit;

generating timestamps and storing the detected audio signal together with the generated timestamps in the microphone unit;

outputting an optical synchronization signal by the microphone unit, wherein the optical synchronization signal contains optical timestamps or light pulses respectively associated with one of the generated timestamps;

detecting at least one video signal by means of at least one camera unit, wherein the video signal at least partially has the optical synchronization signal output by the microphone unit;

extracting the optical timestamps contained in the optical synchronization signal; and synchronizing the video signal and the audio signal based on the timestamps in the audio signal and the optical timestamps extracted from the detected optical synchronization signal.

2. The method as set forth in claim 1;
wherein the timestamps in the microphone unit are generated from an absolute time signal.

3. The method as set forth in claim 1;
wherein the microphone unit comprises at least one microphone selected from the group consisting of a hand-held microphone, a clip-on microphone, and a pocket transmitter unit connected to a microphone by way of a cable.

4. The method as set forth in claim 1;
wherein the microphone unit has a light-emitting surface for output of the optical synchronization signal of between 0.5 and 2 cm$^3$.

5. The method as set forth in claim 1;
wherein the microphone unit is activated once and then the audio signal is continuously detected and stored together with the timestamps;
wherein an association of a video signal detected by the camera unit with a relevant position in the detected audio signal is effected on the basis of the timestamps.

6. The method according to claim 2;
wherein a plurality of detected video signals of a plurality of camera units are configured to be post-synchronized with the detected audio signals on the basis of the timestamps generated from an absolute time signal.

7. A system for detecting and synchronizing audio/video signals comprising:
at least one microphone unit comprising:
a microphone capsule configured to detect audio signals;
an internal clock that continuously generates a time signal, wherein timestamps are generated from the time signal, the timestamps containing the moment in time at which the respective timestamp is generated;
a memory configured to store the detected audio signals and the associated timestamps; and
an optical signal emitter that outputs an optical synchronization signal that contains optical timestamps associated with a respective one of the generated timestamps; and
at least one camera unit comprising:
a controller configured to extract optical timestamps from a detected video signal and to synchronize the detected video signal with an audio signal that is detected by an external microphone unit and which has timestamps, with which a respective one of the optical timestamps is associated, on the basis of the optical timestamps or light pulses and the timestamps in the audio signal;
wherein the system is configured to extract the optical timestamps contained in the optical synchronization signal and to synchronize the video signal and the audio signal based on the timestamps in the audio signal and the optical timestamps extracted from the detected optical synchronization signal.

8. A microphone unit comprising:
a microphone capsule configured to detect audio signals;
an internal clock that continuously generates a time signal, wherein timestamps are generated from the time signal, the timestamps containing the moment in time at which the respective timestamp is generated;
a memory configured to store the detected audio signals and the associated timestamps; and
an optical signal emitter that outputs an optical synchronization signal that contains optical timestamps or light pulses associated with a respective one of the generated timestamps.

9. A camera unit comprising:
a transmission interface that receives and transmits signals; and
a controller configured to extract optical timestamps from a detected video signal and to synchronize the detected video signal with an audio signal that is detected by an external microphone unit and which has timestamps, with which a respective one of the optical timestamps is associated, on the basis of the optical timestamps or light pulses and the timestamps in the audio signal.

* * * * *